UNITED STATES PATENT OFFICE.

ADAM GUNKLACH, HENRY GUNKLACH, AND JACOB GUNKLACH, OF CINCINNATI, OHIO.

BILLIARD-BALL COMPOSITION.

SPECIFICATION forming part of Letters Patent No. 305,448, dated September 23, 1884.

Application filed February 23, 1884. (No specimens.)

*To all whom it may concern:*

Be it known that we, ADAM GUNKLACH, HENRY GUNKLACH, and JACOB GUNKLACH, of Cincinnati, in the county of Hamilton and State of Ohio, have invented a new and useful Improvement in Billiard-Ball Composition, which improvement is fully set forth in the following specification.

The object of the present invention is to provide an improved composition for billiard and pool balls; and it consists of the ingredients combined and arranged in the following proportions, viz: marble-dust, iron filings, or filings of any other minerals, one ounce; litharge, one-half ounce; dissolved rubber, two ounces.

In preparing this compound we first dissolve the rubber in benzine, and allow the benzine to partially evaporate. We then mix thoroughly therein the other ingredients, consisting of the marble-dust, iron, or other mineral filing, and litharge. In this plastic state the mass is formed into a ball or balls of any required size, after which we allow it to dry so that the benzine will thoroughly evaporate. A jacket or coating of rubber is then placed around the whole about an eighth of an inch in thickness, when the whole is placed in a mold adapted for this purpose and compressed. After sufficient compression the coating is vulcanized and the ball turned into shape.

What we claim is—

The herein-described composition for billiard and pool balls, consisting of marble-dust, iron or other mineral filings, litharge, and dissolved rubber, combined and arranged in the proportions specified, substantially as herein set forth.

In testimony that we claim the foregoing we have hereunto set our hands, this 15th day of January, 1884, in the presence of witnesses.

ADAM GUNKLACH.
HENRY GUNKLACH.
JACOB GUNKLACH.

Witnesses:
JOSEPH MEIENBERG,
FRED A. LAMPING.